Sept. 1, 1925.  1,552,137

G. GERACE ET AL

WILLOW SPLITTING MACHINE

Filed June 26, 1924  4 Sheets-Sheet 1

Inventors
G. Gerace
G. Clary

Sept. 1, 1925.

G. GERACE ET AL 1,552,137

WILLOW SPLITTING MACHINE

Filed June 26, 1924

4 Sheets-Sheet 2

Inventors
G. Gerace
G. Clary

By Bryant Lowry
Attorneys

Sept. 1, 1925.

G. GERACE ET AL 1,552,137

WILLOW SPLITTING MACHINE

Filed June 26, 1924

4 Sheets-Sheet 3

Inventors
G. Gerace
G. Clary

By Bryant & Lowry.
Attorneys

Sept. 1, 1925.

G. GERACE ET AL 1,552,137

WILLOW SPLITTING MACHINE

Filed June 26, 1924

4 Sheets-Sheet 4

Inventors
G. Gerace
G. Clary

By Bryant & Lowry
Attorneys

Patented Sept. 1, 1925.

1,552,137

UNITED STATES PATENT OFFICE.

GAETANO GERACE AND GRANT CLARY, OF DETROIT, MICHIGAN.

WILLOW-SPLITTING MACHINE.

Application filed June 26, 1924. Serial No. 722,484.

*To all whom it may concern:*

Be it known that we, (1) GAETANO GERACE and (2) GRANT CLARY, (1) a subject of the King of Italy, and (2) a citizen of the United States of America, residing at Detroit, in the county of Wayne and State of Michigan, have invention certain new and useful Improvements in Willow-Splitting Machines, of which the following is a specification.

This invention relates to certain new and useful improvements in willow splitting machines and has for its primary object to split reeds or willow strips longitudinally into several sections for use in the manufacture of furniture and the like.

Another object of the invention is to provide a willow splitting machine wherein pairs of spaced feed rollers for the willow strips have gear connections with a driven shaft for positively feeding the willow strips through the machine to the splitting die, the upper roller of each pair being vertically slidable and variably tensioned to insure the proper feeding of the willow strips.

A further object of the invention is to provide in a willow strip splitting machine of the type above set forth the provision of a disk blade or saw operatively connected to the driven shaft for squaring the ends of the willow strip prior to the splitting thereof and also for cutting the strips into desired lengths.

A still further object of the invention is to provide a plurality of tensioned gripping and centering guide jaws for the willow strip after the same passes beyond the feed rollers for correctly positioning the same relative to the splitting die, the gripping guide jaws and splitting die being movably supported and cooperating with the upper feed roller of the adjacent pair for positioning the gripping and centering guide jaws directly in line with the space between the adjacent feed rollers.

With the above and other objects in view that will become apparent as the nature of the invention is better understood, the same consists of the novel form, combination and arrangement of parts hereinafter more fully described, shown in the accompanying drawings and claimed.

Figure 1:
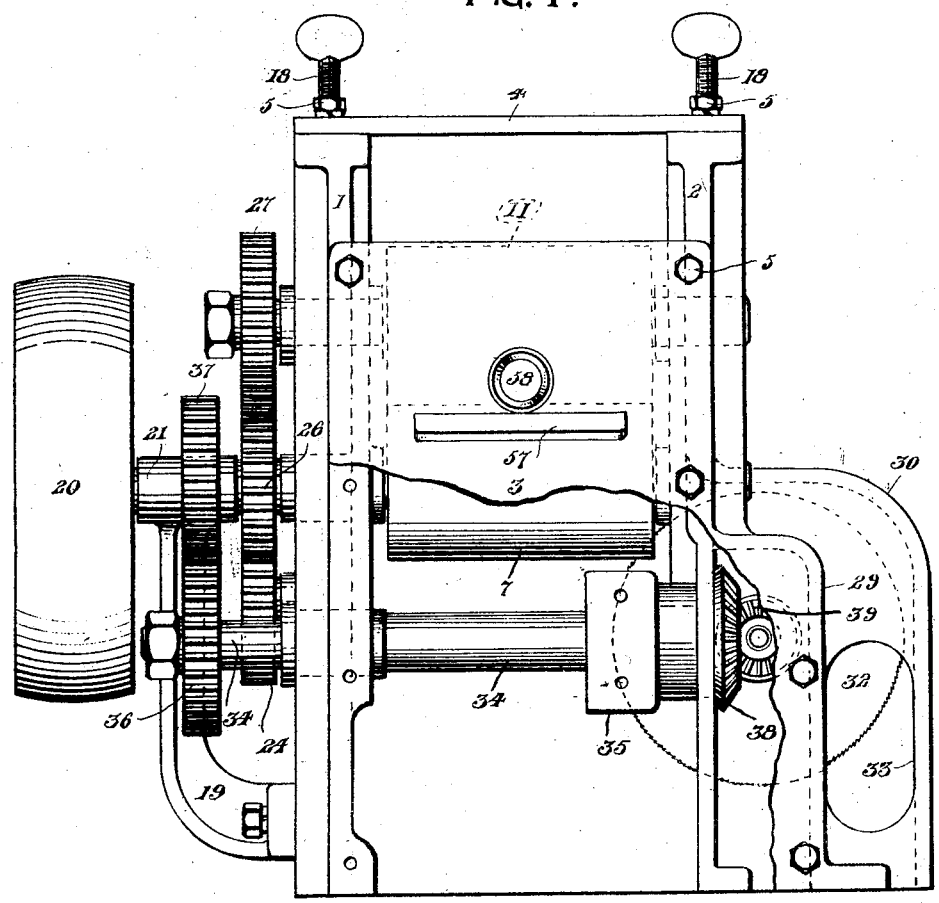
Figure 6:
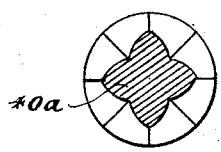
Figure 2:
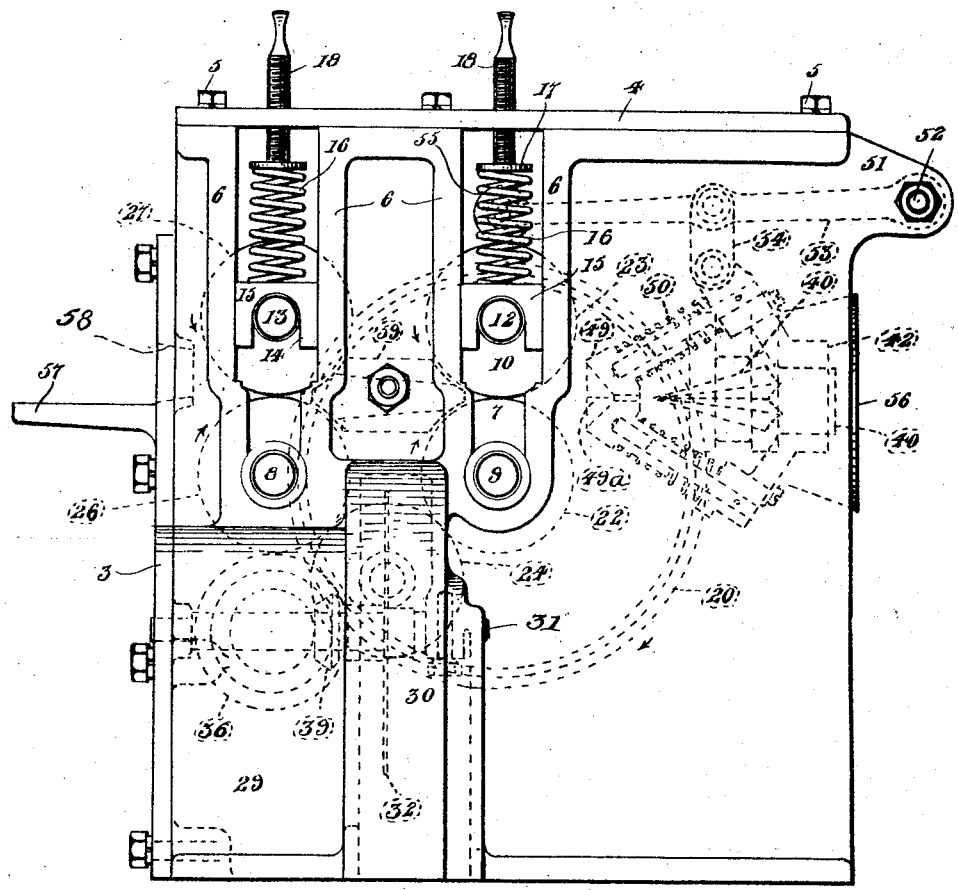
Figure 3:
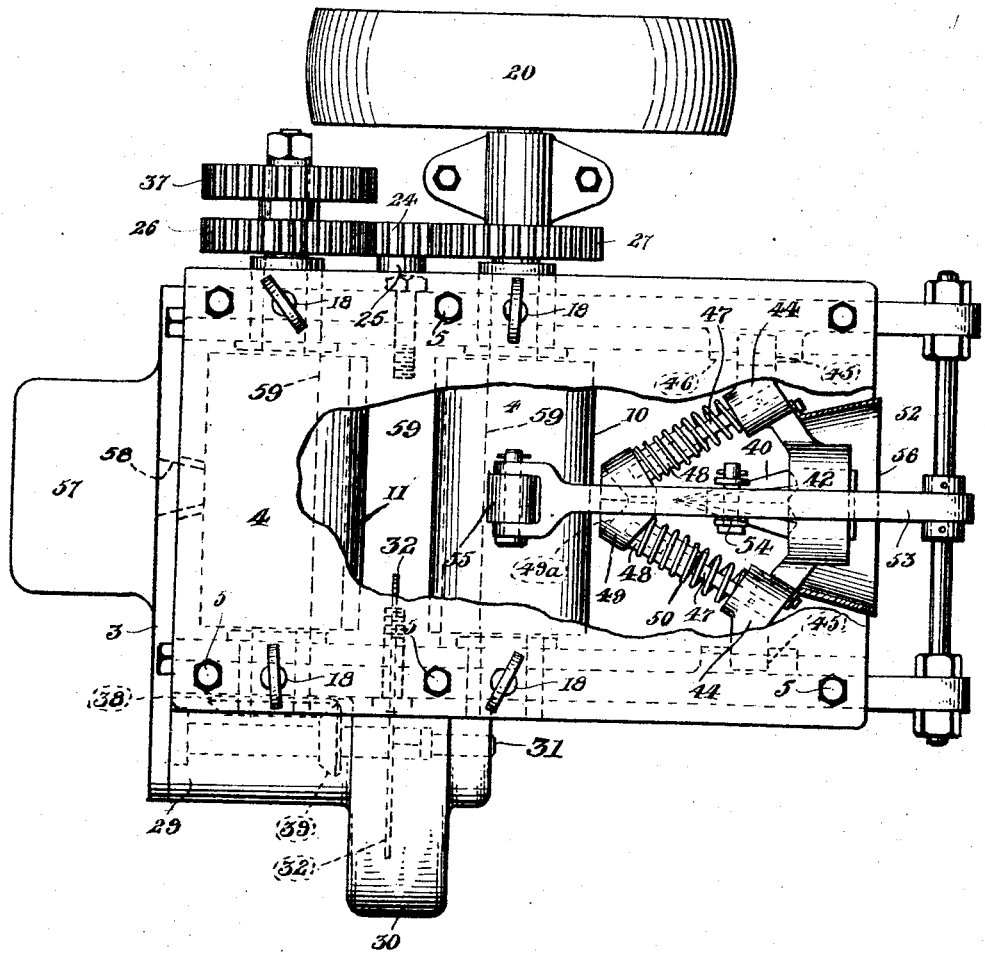
Figure 4:
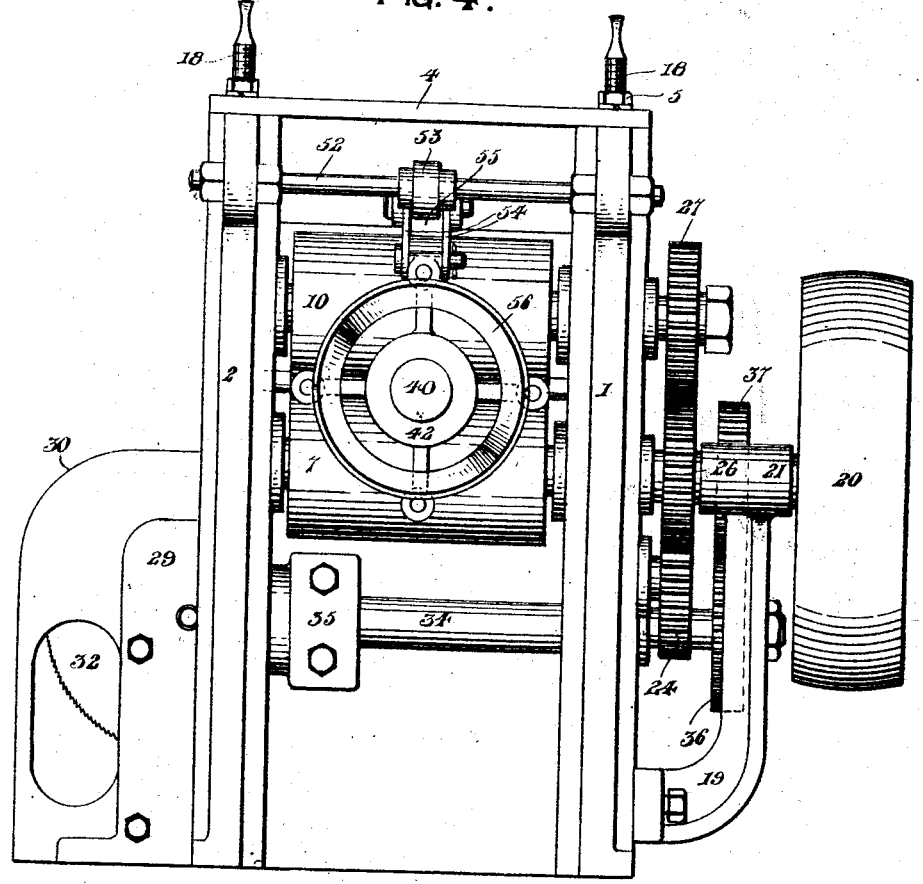
Figure 5:
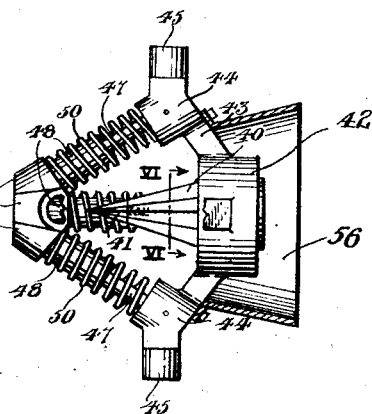

In the drawings, wherein like reference characters designate corresponding parts throughout the several views, Figure 1 is a front elevational view of a willow splitting machine constructed in accordance with the present invention, Figure 2 is a side elevational view of the same, showing the feed rollers for the willow strip and with the upper roller of each pair of feed rollers vertically slidable and resiliently engaging the lower roller, Figure 3 is a top plan view of the machine, Figure 4 is a rear elevational view showing the mounting for the willow splitting die, Figure 5 is a detail elevational view, partly broken away of the splitting die and centering guide jaws associated therewith, and Figure 6 is a cross-sectional view taken on line VI—VI of Fig. 5 showing the four ribbed die for splitting the willow into four sections.

In the manufacture of reed or willow furniture, willow strips are split longitudinally into a plurality of sections to facilitate bending thereof into the desired configurations and formations in the manufacture of such furniture and the machine disclosed in this application is designed for splitting willow strips longitudinally into a plurality of sections for such use. The machine essentially embodies a frame structure having feed rollers for the willow strips, a disk or circular saw for squaring the ends of the willow strips and also for cutting the same into the desired lengths, and a splitting die positioned rearwardly of the feed rollers with tensioned gripping and guide jaws associated with said die for correctly positioning the willow strips relative thereto.

Referring more in detail to the accompanying drawings, there is illustrated a willow splitting machine embodying a frame structure formed of side walls 1 and 2, a connecting front wall 3 and a top wall 4, the several walls being connected together by the bolts 5 as illustrated. The side walls 1 and 2 of the frame structure are provided with spaced vertically extending slotted openings that are bordered by ribs 6 and spaced pairs of feed rollers are mounted in the opening. The lower rollers 7 of each pair are respectively mounted upon shafts 8 and 9 that are journaled in the lower ends of the openings as shown in Fig. 2 while the upper rollers 10 and 11 carried by shafts 12 and 13 respectively are journaled in the openings above the lower rollers 7. The feed rollers may be constructed of any suitable material, the same preferably being formed of metal and covered with a cushioning or friction material such as rubber or leather for effectively gripping willow strips passed therebetween.

The upper feed rollers 10 and 11 are resiliently mounted, the ends of the shafts 12 and 13 extending beyond the side walls 1 and 2 and extending into the downwardly opening grooved sides 14 of the bearing blocks 15 that are positioned between the ribs 6 at each side of the slotted openings in the side walls. To place the upper rollers 10 and 11 under tension, coil springs 16 engage the upper faces of the bearing blocks 15 while the upper ends of the coil springs are engaged by the disk heads 17 carried by the lower ends of the adjusting screws 18 that are threaded through the top wall 4 as clearly shown in Fig. 2. It will therefore be seen that by adjusting the screws 18, tension of the springs 16 is varied for controlling the engaging force between the upper and lower feed rollers of each pair.

The willow strip feeding rollers are positively rotated in the direction indicated by the arrows in Fig. 2, the power devices for operating the several rollers including the shaft 9 of one of the lower rollers 7 that projects beyond the side wall 1 of the frame structure to be further supported in the bracket 19 and carrying a belt pulley 20 upon the end thereof outwardly of the bracket bearing 21. A gear wheel 22 is fixed to the shaft 9 outwardly of the side wall 1 and meshes with the gear 23 upon the corresponding end of the roller shaft 12, the teeth of the meshing gears 22 and 23 being relatively long to permit adjustment of the upper feed roller 10 while the gears 22 and 23 maintain meshing engagement with each other. An idler gear 24 mounted on the stub shaft 25 as shown in Fig. 3, carried by the side wall 1 of the frame structure is in mesh with the gear 22 and said gear 24 in turn meshes with the gear 26 upon the shaft 8 of the lower forward feed roller 7. The gear 26 is in mesh with the gear 27 upon the shaft 13 of the upper forward feed roller and clockwise driven rotation of the belt pulley 20 causes the several gears and feed rollers to rotate in the directions indicated by the arrows in Fig. 2 for feeding a willow strip longitudinally through the frame structure.

The devices for squaring the ends of the willow strips and also for cutting the strips into the desired lengths include laterally offset housings 29 and 30 carried by the side wall 2 of the frame structure adjacent the lower forward end thereof, a stub shaft 31 journaled in the front wall of the housing 29 and the rear wall of the housing 30 has a circular saw blade 32 fixed thereto within the housing 30. The front and rear walls of the housing 30 are cutaway as at 33 to provide an entrance opening for the end of a willow strip for purposes of squaring the ends thereof as will at once be apparent from an inspection of Fig. 1.

The driving means for the circular saw blade 32 includes a shaft 34 journaled at one end in the block 35 carried by the side wall 2 while the other end thereof rotatably extends through the side wall 1 with a gear 36 secured to the projecting end thereof. The gear 36 is in mesh with the gear 37 secured to the roller shaft 8 outwardly of the gear 26 for rotating the shaft 34. The opposite end of the shaft 34 extending into the housing 29 carries a bevel gear 38 that meshes with the bevel gear 39 upon the shaft 31 that carries the circular saw blade 32 to effect continuous rotation of the saw blade when the driving mechanism is in operation.

The splitting device for the willow strip includes a die 40 having a removable point 41 to facilitate sharpening thereof and also for purpose of inexpensive replacement should the point become damaged, the die 40 being supported in the block 42 that is mounted rearwardly of the feed rollers 7 and 10. The splitting die and removable point is illustrated in Fig. 6 as being provided with four equi-distantly spaced ribs 40ª for splitting the willow strips into four sections, but it is to be understood that the die may be provided with any desired number of ribs to correspond with the number of sections into which the willow strip is to be split.

The support for the block 42 includes forwardly divergent arms 43 carried by said block that carry enlargements 44 at their forward ends, the horizontally alined enlargements 44, each carrying an outwardly directed bearing 45 extending between vertically disposed spaced guide ribs 46 as shown in Figs. 2 and 3. Forwardly converging rods 47 are carried by the enlargements 44 and slidably extend into tubular members 48 projecting rearwardly from the centering guide jaws 49 that engage each other as illustrated in Fig. 5 under influence of the spring 50 surrounding the rods and tubular member and interposed between the rods and tubular members and interposed between the enlargements 44 and centering jaws 49, the centering jaws 49 engaging each other directly forwardly of the splitting die 40 and being cutaway at their forward faces to form a willow strip receiving recess 49ª as shown in Figs. 2 and 3. The side walls 1 and 2 of the frame structure carry rearwardly directed extensions 51 at their upper edges and in which a cross shaft 52 is supported, an arm 53 journaled at one end upon the shaft 52 having a link connection 54 with the upper enlargement 44 of the die supporting frame as shown in Figs. 2 and 4. The forward end of the arm 53 is bifurcated as illustrated in Fig. 3 and supports a roller 55 that freely engages the upper side of the feed roller 10 so that when the upper feed rollers 10 and 11 are elevated to permit the passage of a willow strip beneath the same, the splitting die is correspondingly elevated to position the socketed portions 49ª of the centering jaws 49 directly in line with the space between the adjacent feed rollers 7 and 10. A conical guide sleeve 56 is carried by the block 42 for directing the split willow strips rearwardly of the frame structure.

From the above detail description of the machine, it is believed that the construction and operation thereof will at once be apparent, it being noted that the front wall 3 of the frame structure carries a platform 57 positioned beneath the willow strip receiving opening 58, the willow strip being fed through the opening 58 and between the adjacent feed rollers 7 and 11, and through the intermediate guide 59, illustrated in Fig. 2 for delivery to the second set of feed rollers 7 and 10. The forward end of the willow strip is then directed into the socketed portion 49ª of the gripping jaws and pressure thereof upon the gripping jaws will cause the tubular members 48 to telescope upon the rods 47 against the tension of the springs 50 for centering and lightly gripping the willow strip during its delivery to the splitting die point 41. The tension of the upper feed rollers is regulated by the variably tensioned springs 16 under control of the adjusting screw 18 and when the upper feed rollers are elevated by a willow strip passing thereunder, the splitting die mechanism is correspondingly elevated by the arm 53 having its forward roller supporting end engaging the upper roll 10, and further by its link connection 54 with said arm. The willow strips may be inserted in the openings 33 in the housing 30 for having the ends thereof squared before being split, and the circular saw 32 may be also employed for cutting the willow strips into the desired lengths.

While there is herein shown and described the preferred embodiment of the present invention, it is nevertheless to be understood that minor changes may be made therein without departing from the spirit and scope of the invention as claimed.

What is claimed as new is:—

1. In a willow strip splitting machine, a frame structure, strip feeding rollers journaled therein, a splitting die positioned rearwardly of the rollers, said feed rollers being arranged in spaced horizontal pairs with the rollers of each pair vertically alined, the upper roller of each pair being vertically shiftable, bearing blocks associated with the ends thereof, variably tensioned springs engaging the blocks to effect proper gripping of a willow strip fed between the rollers, the splitting die including a die support, tensioned centering jaws on the support for receiving the end of a willow strip, and means carried by the frame and attached to the die support, and cooperating with the upper adjacent roller for holding the splitting die suspended and automatically elevating the same when the upper roller is elevated by a willow strip passing beneath the same.

2. In a willow strip splitting machine, a frame structure, strip feeding rollers journaled therein, a splitting die positioned rearwardly of the rollers, means for guiding the willow strip between the rollers, said feed rollers being arranged in spaced horizontal pairs with the rollers of each pair vertically alined, the upper roller of each pair being vertically shiftable, bearing blocks associated with the ends thereof, variably tensioned springs engaging the blocks to effect proper gripping of a willow strip fed between the rollers, the splitting die including a die support, tensioned centering jaws on the support for receiving the end of a willow strip, and means carried by the frame and attached to the die support, and cooperating with the upper adjacent roller for holding the splitting die suspended and automatically elevating the same when the upper roller is elevated by a willow strip passing beneath the same.

3. In a willow strip splitting machine, a frame structure, strip feeding rollers journaled therein, a splitting die positioned rearwardly of the rollers, a circular saw journaled in the frame structure, means for operating the feed rollers, operative connections between the roller operating means and the saw, said feed rollers being arranged in spaced horizontal pairs with the rollers of each pair vertically alined, the upper roller of each pair being vertically shiftable, bearing blocks associated with the ends thereof, variable tensioned springs engaging the blocks to effect proper gripping of a willow strip fed between the rollers, the splitting die including a die support, tensioned centering jaws on the support for receiving the end of a willow strip, and means carried by the frame and attached to the die support, and cooperating with the upper adjacent roller for holding the splitting die suspended and automatically elevating the same when the upper roller is elevated by a willow strip passing beneath the same.

4. In a willow strip splitting machine, a frame structure, strip feeding rollers journaled therein, a splitting die positioned rearwardly of the rollers, means for guiding the willow strip between the rollers, a circular saw journaled in the frame structure, means for operating the feed rollers, operative connections between the roller operating means and the saw, said feed rollers being arranged in spaced horizontal pairs with the rollers of each pair vertically alined, the upper roller of each pair being vertically shiftable, bearing blocks associated with the ends thereof, variably tensioned springs engaging the blocks to effect proper gripping of a willow strip fed between the rollers, the splitting die including a die support, tensioned centering jaws on the support for receiving the end of a willow strip, and means carried by the frame and attached to the die support, and cooperating with the upper adjacent roller for holding the splitting die suspended and automatically elevating the same when the upper roller is elevated by a willow strip passing beneath the same.

5. In a willow strip splitting machine, a frame structure, strip feeding rollers journaled therein, a splitting die positioned rearwardly of the rollers, said feed rollers being arranged in spaced horizontal pairs with the rollers of each pair vertically alined, the upper roller of each pair being vertically shiftable, bearing blocks associated with the ends thereof, variably tensioned springs engaging the blocks to effect proper gripping of a willow strip fed between the rollers, the splitting die including a die support, tensioned centering jaws on the support for receiving the end of a willow strip, an arm pivotally mounted on the frame, a roller carried by the arm and freely resting upon the upper side of the adjacent upper roller and a link connection between the arm and die support.

6. In a willow strip splitting machine, a frame structure, strip feeding rollers journaled therein, a splitting die positioned rearwardly of the rollrs, means for guiding the willow strip between the rollers, said feed rollers being arranged in spaced horizontal pairs with the rollers of each pair vertically alined, the upper roller of each pair being vertically shiftable, bearing blocks associated with the ends thereof, variably tensioned springs engaging the blocks to effect proper gripping of a willow strip fed between the rollers, the splitting die including a die support, tensioned centering jaws on the support for receiving the end of a willow strip, an arm pivotally mounted on the frame, a roller carried by the arm and freely resting upon the upper side of the adjacent upper roller and a link connection between the arm and die support.

7. In a willow strip splitting machine, a frame structure, strip feeding rollers journaled therein, a splitting die positioned rearwardly of the rollers, a circular saw journaled in the frame structure, means for operating the feed rollers, operative connections between the roller operating means and the saw, said feed rollers being arranged in spaced horizontal pairs with the rollers of each pair vertically alined, the upper roller of each pair being vertically shiftable, bearing blocks associated with the ends thereof, variably tensioned springs engaging the blocks to effect proper gripping of a willow strip fed between the rollers, the splitting die including a die support, tensioned centering jaws on the support for receiving the end of a willow strip, an arm pivotally mounted on the frame, a roller carried by the arm and freely resting upon the upper side of the adjacent upper roller and a link connection between the arm and die support.

8. In a willow strip splitting machine, a frame structure, strip feeding rollers journaled therein, a splitting die positioned rearwardly of the rollers, means for guiding the willow strip between the rollers, a circular saw journaled in the frame structure, means for operating the feed rollers, operative connections between the roller operating means and the saw, said feed rollers being arranged in spaced horizontal pairs with the rollers of each pair vertically alined, the upper roller of each pair being vertically shiftable, bearing blocks associated with the ends thereof, variably tensioned springs engaging the blocks to effect proper gripping of a willow strip fed between the rollers, the splitting die including a die support, tensioned centering jaws on the support for receiving the end of a willow strip, an arm pivotally mounted on the frame, a roller carried by the arm and freely resting upon the upper side of the adjacent upper roller and a link connection between the arm and die support.

In testimony whereof we affix our signatures.

GAETANO GERACE.
GRANT CLARY.